US009048745B2

(12) United States Patent
Seel et al.

(10) Patent No.: US 9,048,745 B2
(45) Date of Patent: Jun. 2, 2015

(54) STARTING UP A DC/DC CONVERTER HAVING A HIGH-FREQUENCY TRANSFORMER

(75) Inventors: Christian Seel, Kassel (DE); Lars Bethke, Goettingen (DE)

(73) Assignee: SMA Solar Technology AG, Niestetal (DE)

( * ) Notice: Subject to any disclaimer, the term of this patent is extended or adjusted under 35 U.S.C. 154(b) by 73 days.

(21) Appl. No.: 13/425,613

(22) Filed: Mar. 21, 2012

(65) Prior Publication Data

US 2012/0176816 A1    Jul. 12, 2012

Related U.S. Application Data

(63) Continuation of application No. PCT/EP2010/063925, filed on Sep. 21, 2010.

(30) Foreign Application Priority Data

Sep. 21, 2009   (EP) ..................................... 09170867

(51) Int. Cl.
*H02M 3/335* (2006.01)
*H02M 1/36* (2007.01)
*H02M 7/48* (2006.01)
*H02J 3/38* (2006.01)

(52) U.S. Cl.
CPC ............ *H02M 1/36* (2013.01); *H02M 3/33569* (2013.01); *H02M 7/4807* (2013.01); *H02J 3/383* (2013.01); *Y02E 10/563* (2013.01)

(58) Field of Classification Search
USPC ........ 323/238, 321, 901, 908; 363/15, 16, 17, 363/21, 24, 25, 26, 34, 41, 56, 97, 98
See application file for complete search history.

(56) References Cited

U.S. PATENT DOCUMENTS

| 4,694,386 | A | * | 9/1987 | de Sartre | ........................ | 363/49 |
| 4,942,600 | A | * | 7/1990 | Suzuki | ..................... | 379/100.15 |

(Continued)

FOREIGN PATENT DOCUMENTS

| EP | 1471626 A2 | 10/2004 |
| EP | 1956703 A1 | 8/2008 |

OTHER PUBLICATIONS

International Search Report dated Jul. 20, 2011 for International Application No. PCT/EP2010/063925. 15 Pages.

(Continued)

*Primary Examiner* — Matthew Nguyen
*Assistant Examiner* — Afework Demisse
(74) *Attorney, Agent, or Firm* — Eschweiler & Associates, LLC

(57) ABSTRACT

During startup of a DC/DC converter having a high-frequency transformer whose primary winding is supplied with current from an input-side DC link via an inverter bridge having pulsed switches and whose secondary winding is used to charge an output-side DC link via a rectifier bridge. The switches of the inverter bridge are operated to load the output-side DC link, in a manner that deviates from a normal operation of the switches in order to limit the currents that flow in the DC/DC converter during startup of the DC/DC converter. Particularly, the switches of the inverter bridge are operated during startup of the DC/DC converter at a pulse width that is fixed during each of a limited number of stages of the startup, and have a duty cycle that is not more than 5 percent during each of the stages of the startup.

19 Claims, 1 Drawing Sheet

(56) References Cited

U.S. PATENT DOCUMENTS

| | | | |
|---|---|---|---|
| 5,781,419 A * | 7/1998 | Kutkut et al. | 363/17 |
| 6,091,610 A * | 7/2000 | Garcia et al. | 363/17 |
| 7,499,290 B1 * | 3/2009 | Mazzola et al. | 363/17 |
| 7,672,149 B2 | 3/2010 | Falk | |
| 7,863,833 B2 * | 1/2011 | Tamegai et al. | 315/307 |
| 8,264,857 B2 * | 9/2012 | Mallwitz et al. | 363/21.02 |
| 2006/0055389 A1 * | 3/2006 | Rice | 323/288 |
| 2007/0132438 A1 | 6/2007 | Jang et al. | |
| 2008/0192510 A1 | 8/2008 | Falk | |

OTHER PUBLICATIONS

Anonymous: "IR2085S (PbF) High Speed, 100V, Self Oscillating 50% Duty Cycle Half-Bridge Driver", Internet Citation, Jul. 2006, pp. 1-10, XP-002583669 International Rectifier. 10 Pages.

\* cited by examiner

STARTING UP A DC/DC CONVERTER HAVING A HIGH-FREQUENCY TRANSFORMER

REFERENCE TO RELATED APPLICATIONS

This application is a continuation of International Application Number PCT/EP2010/063925 filed on Sep. 21, 2010, which claims priority to European Patent Application Number EP 09170867.7 filed on Sep. 21, 2009.

FIELD OF THE INVENTION

The present invention generally relates to a method of starting up a DC/DC converter having a high-frequency transformer. Further, the present invention generally relates to a DC/DC converter having a high-frequency transformer.

BACKGROUND OF THE INVENTION

If the input-side DC link of a DC/DC converter on the primary side of a high-frequency transformer is charged by, for example, an increasing output voltage from a connected photovoltaic module, which normally involves charging at least one buffer capacitor in said DC link, this will have no effect on the charging state of the output-side DC link of the DC/DC converter on the secondary side of the high-frequency transformer. When the switches of an inverter bridge used to supply current to the primary side of the high-frequency transformer from the input-side DC link start to get alternately closed, extremely high currents will result due a missing counter-voltage in the output-side DC link. These currents can easily exceed a maximum threshold above which the integrity of the DC/DC converter and, in particular, its semiconductor components are jeopardized. This holds especially if the switches of the inverter bridge are operated at a frequency in the order of a magnitude of the resonant frequency of a resonant circuit including the primary side of the high-frequency transformer in order to minimize the passive losses in the DC/DC converter. In this case, the currents that flow when the switches of the inverter bridge are closed during DC/DC converter startup are almost entirely unattenuated. An intentional attenuation of these currents would in return increase power loss under normal DC/DC converter operation.

A known solution to this problem involves operating the switches of the inverter bridge during startup at a frequency that is significantly higher than a frequency at which the switches are operated during normal operation of the DC/DC converter. The increased frequency used in this method depends on the voltage present at the input-side DC link. The higher the voltage is the higher is the frequency at which the inverter bridge switches are operated during startup. As a consequence of increasing the frequency while keeping the time in which the switches are open constant (as a percentage value), currents can increase only for a very short period of time before their direction is reversed by the reversal of switch positions. This means that increasing the frequency when operating the switches of the inverter bridge during startup has the direct effect of limiting the currents. Note, however, that this measure is insufficient if the output-side DC link of the DC/DC converter is not yet charged at all. Therefore, internal power supply transformers of described prior art feature an additional winding that pre-charges the output-side DC link to 150 V so that the voltage difference between the input-side DC link and the output-side DC link is reduced in advance. Both the additional frequency for clocking the inverter bridge switches and the additional winding in the internal power supply transformer mean a significant amount of effort in order to effectively limit the currents when starting up the DC/DC converter with a high-frequency transformer.

U.S. Pat. No. 6,091,610 A discloses a system and a method for reducing transient switch currents in an asymmetrical half bridge converter. The converter includes a high-frequency transformer having a split DC link and an asymmetrical inverter half bridge comprising a main switch and a complementary switch at its primary side and a rectifier half-bridge as well as a DC link at its secondary side. A soft-start of the converter is described as one way to avoid transient currents capable of causing switch failure. Initially, the asymmetrical half bridge is off and the duty cycle of the main switch is at zero. To turn on the asymmetrical half bridge, the duty cycle of the main switch is gradually increased until the steady state duty cycle is reached. The output voltage may thus be gradually increased, thereby avoiding high peak currents. However, since the main and complementary switches are on for complementary periods, the complementary switch may initially be on for a large period of time. Energy stored in a second input capacitor may, therefore, rapidly discharge through the complementary switch during the initial switching cycles. This rapid discharge may produce a large pulse of current through the complementary switch, causing it to get damaged. To reduce the current stress occurring in the complementary switch as the converter turns on, a conductive path is coupled across the DC link at the primary side of the transformer to substantially discharge it and thereby reduce the current stress in the complementary switch when the converter turns on.

Thus, there still is a need for a method and a DC/DC converter in which the maximum currents present during startup are effectively limited without needing to fulfill complicated equipment requirements to this end.

SUMMARY

The present invention relates to a method of starting up a DC/DC converter having a high-frequency transformer whose primary winding is supplied with current from an input-side DC link via an inverter bridge having pulsed switches and whose secondary winding is used to charge an output-side DC link via a rectifier bridge, the method comprising the step of operating the switches of the inverter bridge during startup of the DC/DC converter to load the output-side DC link, in a manner that deviates from a normal operation of the switches in order to limit the currents that flow in the DC/DC converter during startup, wherein, in the step of operating the switches of the inverter bridge during startup of the DC/DC converter, the switches are operated at a pulse width that is fixed during each of a limited number of stages of the startup, and that is not more than 5 percent during each of the stages of the startup.

Further, the present invention relates to a DC/DC converter having a high-frequency transformer whose primary winding is supplied with current from an input-side DC link via an inverter bridge having pulsed switches and whose secondary winding is used to charge an output-side DC link via a rectifier bridge, and a controller for operating the switches of the inverter bridge that operates the switches of the inverter bridge during startup of the DC/DC converter to load the output-side DC link, in a manner that deviates from a normal operation of the switches in order to limit the currents that flow in the DC/DC converter during startup, wherein the controller operates the switches of the inverter bridge during startup of the DC/DC converter at a pulse width that is fixed during each of a limited number of stages of the startup, and that is not more than 5 percent during each of the stages of the startup.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. In the drawings, like reference numerals designate corresponding parts throughout the several views.

DETAILED DESCRIPTION

Figure 1:
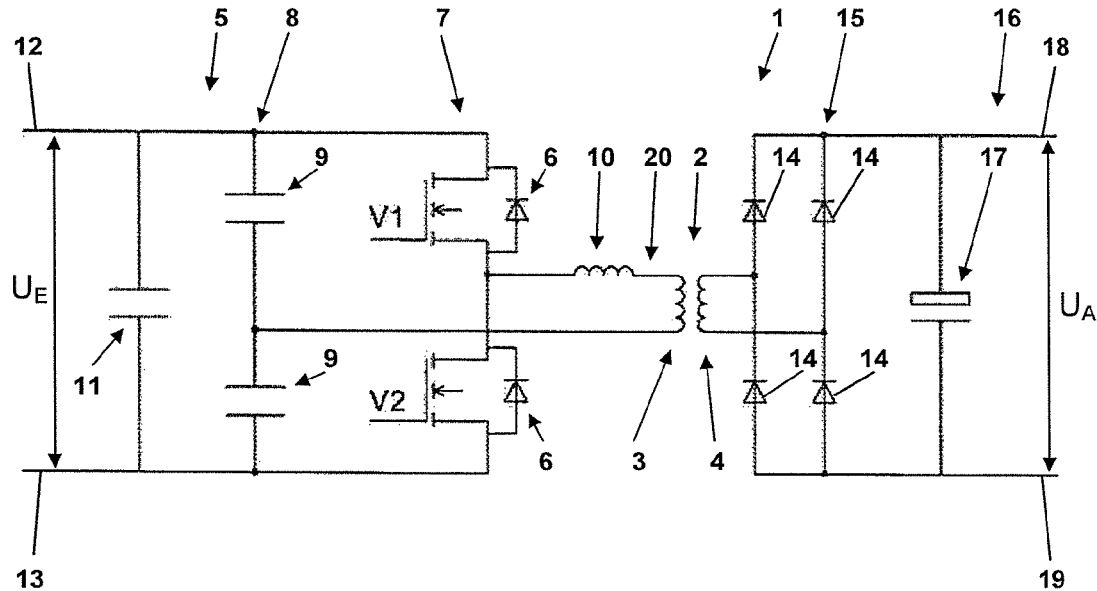
FIG. 1 depicts the basic design of a DC/DC converter with high-frequency transformer in accordance with the present invention.

The present invention generally relates to a method of starting up a DC/DC converter having a high-frequency transformer whose primary winding is supplied with current from an input-side DC link via an inverter bridge having pulsed switches and whose secondary winding is used to charge an output-side DC link via a rectifier bridge. Further, the present invention generally relates to a DC/DC converter having a high-frequency transformer whose primary winding is supplied with current from an input-side DC link via an inverter bridge having pulsed switches and whose secondary winding is used to charge an output-side DC link via a rectifier bridge, and a controller for operating the switches of the inverter bridge.

More particularly the present invention generally relates to a method of starting up a DC/DC converter and to a DC/DC converter in which the switches of the inverter bridge during startup of the DC/DC converter are operated to load the output-side DC link, in a manner that deviates from a normal operation of the switches in order to limit the currents that flow in the DC/DC converter during startup.

The present invention may be applied to inverters that supply electric energy from a DC source to an AC power grid and that include a high-frequency (HF) transformer, which electrically isolates the input side of the inverter from its output side and which may also systematically increase or decrease the input DC voltage. More specifically, the present invention may be applied to inverters that supply electric energy from photovoltaic modules to an AC power grid. Note that the invention may also be used in other technical fields.

In the present invention, the switches of the inverter bridge are operated at a fixed pulse width or duty cycle of 5 percent or less to charge the output-side DC link of the DC/DC converter. This pulse width may only be incremented between discrete stages of the startup, if the startup of the DC/DC converter comprises more than one such stage. Rather than increasing the frequency at which the switches are operated in the startup sequence, the invention opts to reduce the pulse width instead. Ordinary pulse width modulation for adjusting the current to a specific value, however, is not part of this process as such a common pulse width modulation would be extremely complicated, if implementable at all, under the special circumstances that prevail during startup. Rather, pulse widths are used that have empirically been determined to allow for the current being effectively limited during startup despite the high voltage difference between the primary side and the secondary side of the high-frequency transformer. Although the pulse width can be increased during startup, i.e. from stage to stage of the startup, this does not occur in a continuous or quasi-continuous manner, but rather incrementally from one fixed pulse width to the next higher fixed pulse width. It is quite surprising that the present invention can bring about a reduction of the currents flowing during startup not only in theory but also in practice, considering that the switches of the inverter bridge of a DC/DC converter with high-frequency transformer are usually optimized for a pulse width of about 50%. This applies in particular to the embodiment of the present invention in which the fixed pulse width used to clock the inverter bridge switches does not exceed 2 percent in any stage of the startup. Such very small pulse widths may be necessary to maintain the desired maximum currents with very minor attenuation of the current on the primary side.

The pulse width may be increased over two or more, specifically two to four stages of the startup with a typical increase of the pulse width or duty cycle from stage to stage of 50 to 100 percent of the shorter pulse width in the previous stage. The present invention, however, does not include a fixed scheme, i.e., fixed percentage, for increasing the pulse width between each step. Rather, it is possible to have each pulse width chosen from a number of pulse widths that do not result in interferences (e.g., resonance effects) when applied to operate the switches of the inverter bridge.

If the pulse width is increased from stage to stage of the startup, it is possible to increase the pulse width to the next higher value when the difference between the DC voltage of the input-side DC link and the DC voltage of the output-side DC link converted to the input-side DC link falls below a predetermined threshold. The conversion of the DC voltage of the output-side DC link to the input-side DC link takes into account the transformer ratio of the high-frequency transformer. It is sufficient in one embodiment to check whether the DC voltage difference has fallen below this threshold at specific times only. Further, if the DC voltage difference does not decrease as expected within a given period of time, the startup sequence may be terminated and an error message may be generated.

In one embodiment, the switches of the inverter bridge will be operated during startup at exactly the same frequency as it is used under normal DC/DC converter operation. This basically means that operating the switches of the inverter bridge requires only one clock signal output with a fixed clock signal frequency. Usually this frequency ranges from 16 to 96 kHz and may, for example, be at 48 kHz.

In an embodiment of the present invention, the switches of the inverter bridge are also operated at a fixed preset pulse width (e.g., from at least 40 to almost 50 percent) under normal operation after the DC/DC converter has been started up.

If the pulse width is incrementally increased from stage to stage of the startup of the DC/DC converter, and not just fixed at one value during the entire startup, then this process always begins with the smallest pulse width, regardless of whether the secondary side of the high-frequency transformer is already charged, still partially charged, or not yet charged at all. Always beginning with the smallest pulse width prevents excessive currents even during the initial symmetrizing of the voltage at the split capacitors that are used to split the voltage on the primary side of the high frequency transformer.

In a DC/DC converter based on the present invention, the new method is implemented by means of a controller for operating the switches of the inverter bridge. To perform this task, the controller or control unit will, in one embodiment, take into account the difference between the DC voltage of the input-side DC link and the DC voltage of the output-side DC link converted to the input-side DC link.

In one embodiment the primary side of the high-frequency transformer will be part of a resonant circuit that has a resonant frequency. The switches of the inverter bridge will be operated at a lower frequency (e.g., at a frequency that is about 25 percent lower) than this resonant frequency both during startup and during normal DC/DC converter operation. In one embodiment the inverter bridge is a half bridge with two complementarily clocked switches, the current being commutated via a parallel half bridge comprising two capacitors that are part of the resonant circuit.

Referring now in greater detail to the drawings, FIG. 1 illustrates a DC/DC converter 1 having a high-frequency transformer 2 that includes a primary winding 3 and a secondary winding 4. At its one end, the primary winding 3 is supplied with current in alternating flow directions from an input-side DC link 5 via two alternately closed switches V1 and V2 that each have free-wheeling diodes 6 connected in parallel. The switches V1 and V2 form an inverter half bridge 7. A further half bridge 8 comprising two capacitors 9 whose center point is linked to the other end of the primary winding 3 is connected in parallel to the inverter half bridge 7. The capacitors 9 are used in combination with an inductor 10 arranged between the center point of the bridge 7 and the primary winding 3 to set up a resonant circuit having a resonant frequency, the switches V1 and V2 being alternately closed at a somewhat lower frequency. The DC link 5 further has a buffer capacitance 11. This capacitor buffers an input voltage $U_E$, which is present between input lines 12 and 13 of the DC link, over time periods during which a respective one of the switches V1 and V2 is open and accordingly charge is discontinuously drawn from the link. The secondary winding 4 of the high frequency transformer 2 is connected to a rectifier bridge 15 that is composed of diodes 14 and that serves to charge an output-side DC link 16 including a buffer capacitor 17 to an output voltage $U_A$ between output lines 18 and 19.

When the input voltage $U_E$ is applied to the input lines 12 and 13 for the first time, the buffer capacitor 11 as well as the capacitors 9 and, thus, the DC link 5 will be charged, while the buffer capacitor 17 and, thus, the DC link 16 remain uncharged. The DC link 16 will only be charged when the switches V1 and V2 are alternately closed for the first time. If, however, the switches V1 and V2 would be directly operated at a 50 percent pulse width, which is typical for subsequent normal operation of the DC/DC converter 1, and at a frequency in the order of a magnitude of the resonant frequency of the resonant circuit including the primary winding 3, the currents would be limited only by the leakage inductances and internal resistances of the resonant circuit components. Since these leakage inductances and internal resistances are minimized for the purpose of achieving a high efficiency of the DC/DC converter under normal operation, the resulting currents could get so large that this leads to the thermal destruction of the switches V1 and V2, which, in this embodiment, are semiconductor components. This risk increases with the voltage difference between the input-side DC link 5 and the output-side DC link 16 (i.e., with the difference between the input voltage $U_E$ and the output voltage $U_A$). To handle this problem, the pulse width, i.e. the period of time for which the switches V1 and V2 are alternately closed, which is also referred to as the duty cycle of the switches V1 and V2, is considerably reduced during DC/DC converter startup (i.e., when starting operation of the DC/DC converter while the DC link 16 is not yet fully charged). In this way the currents flowing through the switches V1 and V2 can be limited to an acceptable level, even though the switches are operated at the same frequency during both startup and subsequent normal operation of the DC/DC converter 1. By means of these limited currents, the output-side DC link 16 can be charged until the counter-voltage at the secondary winding 4 has been increased to a value at which normal DC/DC converter operation can be enabled. In this startup, the switches V1 and V2 are operated at a fixed predefined pulse width, which is increased incrementally when the voltage difference between the DC link 5 and DC link 16 (i.e., the difference between the input voltage $U_E$ and the output voltage $U_A$) falls below a certain threshold at specified sample points. When specifying the threshold for the voltage difference, the winding ratio between the primary winding 3 and the secondary winding 4, i.e., the resulting transformer ratio of the high-frequency transformer 2, is taken into account in one embodiment. In the present example this ratio is 7:5, which means that an input voltage $U_E$ of 700 V is reduced to an output voltage $U_A$ of 500 V under normal DC/DC converter operation. The primary task of the DC/DC converter, however, is to provide a galvanic isolation between the DC link 5 and DC link 16 with the smallest possible coil forms and minimum losses. The individual pulse widths used to operate the alternately closed switches V1 and V2 during the individual stages of the startup sequence are not only selected for the purpose of limiting the current flowing through the switches V1 and V2, but are also selected to not cause interferences in the DC/DC converter or the surrounding electronic environment, which can happen with very short pulses of high power. Further, during DC/DC converter startup in one embodiment the process of operating the switches V1 and V2 always begins with the smallest pulse width, because the intended function of the two capacitors 9 to equally distribute the input voltage $U_E$ is, due to component tolerances, not guaranteed as long as no current is drawn from the DC link 5. If the capacitors 9 fail to equally distribute the voltages and if the switches V1 and V2 are then closed alternately, the resulting voltage asymmetry will lead to an "unbalanced" current load on the switches V1 and V2. This means that one of the switches may initially have to conduct a current up to twice the average current of a switching period until the voltage at the capacitors 9 becomes symmetric and the currents are equally distributed over both switches V1 and V2. This effect can even occur in situations when the output voltage $U_A$ is larger than zero, which would mean that the voltage difference between $U_E$ and $U_A$ suggests that the startup sequence could actually begin with the second step of the startup, i.e., with a longer pulse width. Therefore, it is desirable that the procedure always starts operating the switches V1 and V2 at the smallest pulse width independent of the initial charging status of the output-side DC link 16.

Figure 2:
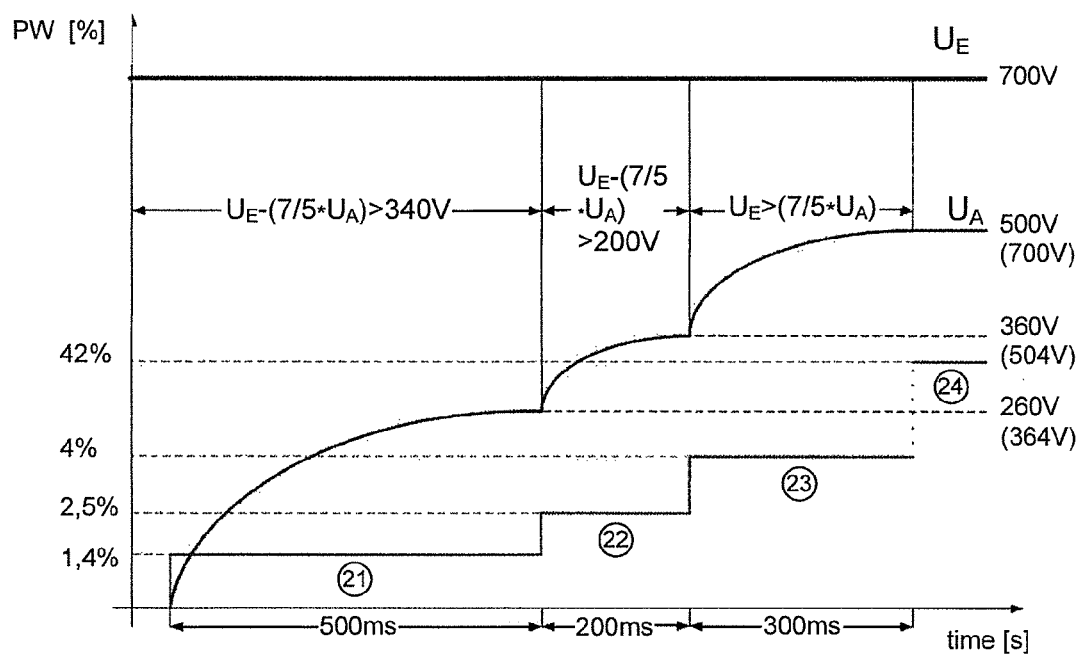
FIG. 2 outlines how the output-side DC link of the DC/DC converter shown in FIG. 1 is incrementally charged in accordance with the present invention.

FIG. 2 illustrates how the DC link 16 is charged during DC/DC converter 1 startup in stages according to one embodiment. The achieved output voltages $U_A$ are given on the right, with the output voltages converted to the input-side DC/DC link based on the 7:5 transformer ratio of the DC/DC converter given additionally in brackets. The input voltage $U_E$ is indicated at the very top. The various stages of the start-up sequence are outlined over time. On the left, the pulse width used to operate the switches V1 and V2 of FIG. 1 during stages 21 to 23 is indicated in percent. In the first stage 21 the pulse width or duty cycle is 1.4 percent, i.e., the switches V1 and V2 are alternately closed for 1.4 percent of each operation period. This stage usually takes 500 ms and ends if after these 500 ms the condition $U_E-(7/5*U_A)>340$ V no longer holds, i.e., if the voltage difference between the input voltage and the converted output voltage has decreased to 340 V or less. If this is not the case, stage 21 is extended by another 500 ms. If the voltage difference is still greater than 340 V after 2 seconds, the start-up sequence will be terminated and an error message will be issued. According to one embodiment, in the next stage 22, the pulse width is in one increment increased to 2.5 percent, i.e., by about 80 percent of the previous pulse width. This stage usually takes 200 ms and ends when a query sent after 200 ms shows that the condition $U_E-(7/5*U_A)>200$ V is no longer valid, i.e., if the voltage difference has decreased to 200 V or less. In the third stage 23 according to one embodiment, the pulse width is in one increment raised to 4 percent, i.e., by 60 percent of the previous pulse width. This stage lasts until the condition $U_E=(7/5*U_A)$ applies, i.e., until the voltage difference has decreased to zero taking into account the transformer ratio of the DC/DC converter. After that the DC/DC converter switches to normal operation in which the switches V1 and V2 are each operated at a pulse width of 42 percent. As this occurs only after the output-side DC link 16 of FIG. 1 is fully charged, excessive currents through the switches V1 and V2 are effectively avoided. If the attenuation of the resonant circuit 20 shown in FIG. 1 is very small, the values specified in FIG. 2 for the pulse widths in the steps 21 to 23 may already be too high for adequately limiting the current through the switches V1 and V2 during DC/DC converter 1 startup. In this case the pulse widths need to be reduced down to a range of, e.g., 0.5 to 2 percent. Surprisingly, even this is possible with semiconductor switches, particularly MOSFETs, even if they are optimized for a pulse width close to 50 percent for normal DC/DC converter 1 operation. The reason for this is the ability of MOSFET semiconductor switches to switch very rapidly in the presence of high currents, which are implicitly to be switched off safely in the situation of the startup.

Many variations and modifications may be made to the embodiments of the invention without departing substantially from the spirit and principles of the invention. All such modifications and variations are intended to be included herein within the scope of the present invention, as defined by the following claims.

What is claimed is:

1. A method of starting up a DC/DC converter having a high-frequency transformer that comprises a primary winding that is supplied with current from an input-side DC link via an inverter bridge having pulsed switches and comprising a secondary winding configured to charge an output-side DC link via a rectifier bridge, the method comprising operating the switches of the inverter bridge during a startup of the DC/DC converter to load the output-side DC link in a manner that deviates from a normal operation of the switches in order to limit the currents that flow in the DC/DC converter during the startup of the DC/DC converter, wherein operating the switches of the inverter bridge during the startup of the DC/DC converter comprises switching the switches at a pulse width that is fixed during each of a limited number of stages of the startup, and wherein a duty cycle of the switches is not more than 5 percent during each of the stages of the startup.

2. The method of claim 1, wherein operating the switches of the inverter bridge during the startup of the DC/DC converter comprises switching the switches at not more than a 2 percent duty cycle during each of the stages of the startup.

3. The method of claim 1, wherein operating the switches of the inverter bridge during the startup of the DC/DC converter comprises increasing the pulse width and thus the duty cycle of the switches from stage to stage of the startup.

4. The method of claim 3, wherein operating the switches of the inverter bridge during the startup of the DC/DC converter comprises increasing the pulse width from stage to stage by 50% to 100% of the pulse width of the previous stage of the startup.

5. The method of claim 3, wherein operating the switches of the inverter bridge during the startup of the DC/DC converter comprises selecting a number of the stages over which the pulse width at which the switches are operated is increased from two, three and four stages.

6. The method of claim 1, wherein operating the switches of the inverter bridge during the startup of the DC/DC converter comprises selecting the pulse width during each of the stages of the startup from such values of the pulse widths at which the DC/DC converter operates interference-free.

7. The method of claim 6, wherein operating the switches of the inverter bridge during the startup of the DC/DC converter comprises selecting the pulse width during each of the stages of the startup from a list of a limited number of values of the pulse widths at which the DC/DC converter operates interference-free.

8. The method of claim 1, wherein operating the switches of the inverter bridge during the startup of the DC/DC converter proceeds to a next stage, when a difference between a DC voltage of the input-side DC link and a DC voltage of the output-side DC link maintains or falls below a predefined threshold.

9. The method of claim 1, wherein operating the switches of the inverter bridge during the startup of the DC/DC converter comprises operating the switches of the inverter bridge at a same frequency as under a normal operation after the startup of the DC/DC converter.

10. The method of claim 9, wherein the switches of the inverter bridge are operated at a fixed frequency selected from a range ranging from 16 kHz to 96 kHz.

11. The method of claim 1, wherein the pulse width at which the switches of the inverter bridge are operated under normal operation after the startup of the DC/DC converter is fixed.

12. The method of claim 11, wherein the pulse width at which the switches of the inverter bridge are operated under normal operation after the startup of the DC/DC converter is selected from a range ranging from 40 percent to 50 percent.

13. The method of claim 1, wherein during a first stage of operating the switches of the inverter bridge during the startup of the DC/DC converter, operating the switches of the inverter bridge at a shortest pulse width compared to subsequent stages independent of an actual difference between a DC voltage of the input-side DC link and a DC voltage of the output-side DC link.

14. A DC/DC converter, comprising:
   a high-frequency transformer comprising a primary winding supplied with current from an input-side DC link via an inverter bridge comprising pulsed switches, and comprising a secondary winding configured to charge an output-side DC link via a rectifier bridge; and
   a controller configured to operate the switches of the inverter bridge during a startup of the DC/DC converter to load the output-side DC link, in a manner that deviates from a normal operation of the switches after the startup, in order to limit the currents that flow in the DC/DC converter during the startup of the DC/DC converter, wherein the controller is configured to operate the switches of the inverter bridge during the startup of the DC/DC converter at a pulse width that is fixed during each of a limited number of stages of the startup, and wherein a duty cycle of the switches is not more than 5 percent during each of the stages of the startup.

15. The DC/DC converter of claim 14, wherein the controller is configured to monitor a DC voltage of the input-side DC link and a DC voltage of the output-side DC link.

16. The DC/DC converter of claim 14, wherein a primary side of the high-frequency transformer is part of a resonant circuit.

17. The DC/DC converter of claim 16, wherein the inverter bridge is a half bridge with two switches operated at a phase offset of 180 degrees and wherein the current is commutated via a parallel bridge comprising two capacitors.

18. The DC/DC converter of claim 14, wherein the controller operates the switches at a same frequency during startup of the DC/DC converter and under a normal operation of the DC/DC converter.

19. A DC/DC converter, comprising:
a transformer comprising a primary side and a secondary side;
a bridge circuit configured to receive a control signal and switch in a controller fashion to drive the primary side of the transformer;
a controller configured to generate the control signal in a startup mode and a normal mode of the DC/DC converter,
wherein in the startup mode the control signal limits a duty cycle of the switching of the bridge circuit to 5% or less,
wherein the startup mode comprises a plurality of successive stages, and wherein the controller is configured to limit the duty cycle of the switching of the bridge circuit to 5% or less for each of the plurality of successive stages, and wherein the controller is configured to increase the duty cycle in each successive stage once a predetermined relationship is achieved between an input voltage and an output voltage of the DC/DC converter.

* * * * *